(12) United States Patent
Zeuner et al.

(10) Patent No.: US 11,745,640 B2
(45) Date of Patent: Sep. 5, 2023

(54) IMPACT-ABSORBING VEHICLE HEADLAMP SYSTEM

(71) Applicant: ZKW Group GmbH, Wieselburg (AT)

(72) Inventors: Markus Zeuner, Mank (AT); Florian Wagner, Winklarn (AT); Markus Bemmerl, Loosdorf (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/081,598

(22) Filed: Dec. 14, 2022

(65) Prior Publication Data

US 2023/0191983 A1    Jun. 22, 2023

(30) Foreign Application Priority Data

Dec. 16, 2021 (EP) ..................... 21215092

(51) Int. Cl.
*B60Q 1/04* (2006.01)
*F21S 41/19* (2018.01)

(52) U.S. Cl.
CPC .......... *B60Q 1/0491* (2013.01); *B60Q 1/0441* (2013.01); *F21S 41/196* (2018.01)

(58) Field of Classification Search
CPC .... B60Q 1/0491; B60Q 1/0441; F21S 41/196
See application file for complete search history.

(56) References Cited

U.S. PATENT DOCUMENTS 4,614,015 A * 9/1986 Nagare ................... F21V 19/04
439/152
6,478,456 B1 * 11/2002 Eichhorn ............. B60Q 1/0491
362/546

(Continued)

FOREIGN PATENT DOCUMENTS

FR     2983142 A1   5/2013
JP   H03208738 A    9/1991

(Continued)

OTHER PUBLICATIONS

Search Report for European Patent Application No. 21215092.4, dated May 2, 2022 (5 pages).

*Primary Examiner* — Zheng Song
(74) *Attorney, Agent, or Firm* — Eversheds Sutherland (US) LLP

(57) ABSTRACT

A self-absorbent vehicle headlamp system including (i) a vehicle frame element that can be firmly connected to a vehicle; (ii) a vehicle headlamp housing displaceably held on the vehicle frame element, having at least one pin that is firmly connected to the vehicle headlamp housing, wherein the vehicle frame element includes at least one guide for receiving and linearly guiding the pin, wherein the pin is in engagement with the guide, so that the vehicle headlamp housing is guided by the pin being displaced along the guide and is thereby displaceable with respect to the vehicle frame element; (iii) at least one triggering element that can be mechanically connected to a bumper of a vehicle, and (iv) at least one triggering mechanism that is firmly connected to the vehicle frame element and is configured to receive the triggering element and the pin and to change at least as a function of the position of the triggering element, between a state (S1) blocking the pin and a state (S2) releasing the pin, wherein in the state (S2), the vehicle headlamp housing including the pin is displaceable with respect to the vehicle frame element.

15 Claims, 2 Drawing Sheets

(56) References Cited

U.S. PATENT DOCUMENTS

| | | | | |
|---|---|---|---|---|
| 7,029,154 | B2* | 4/2006 | Arion | B60Q 1/0495 |
| | | | | 362/390 |
| 7,517,121 | B2* | 4/2009 | Arion | B60Q 1/0491 |
| | | | | 362/549 |
| 2003/0142503 | A1* | 7/2003 | Ericsson | B60Q 1/0491 |
| | | | | 362/487 |
| 2003/0179589 | A1* | 9/2003 | Eto | F21S 45/48 |
| | | | | 362/547 |
| 2007/0139945 | A1* | 6/2007 | Maliar | F21S 41/192 |
| | | | | 362/509 |
| 2020/0324684 | A1 | 10/2020 | Pakiman | |
| 2021/0140600 | A1* | 5/2021 | Aparo | F21V 17/18 |

FOREIGN PATENT DOCUMENTS

| | | |
|---|---|---|
| JP | H0930321 A | 2/1997 |
| JP | H11165581 A | 6/1999 |
| JP | 2021079770 A | 5/2021 |

\* cited by examiner

IMPACT-ABSORBING VEHICLE HEADLAMP SYSTEM

CROSS-REFERENCE TO RELATED APPLICATIONS

This application claims priority to European Patent Application No. 21215092.4, filed Dec. 16, 2021, which is incorporated herein by reference.

FIELD OF THE INVENTION AND DESCRIPTION OF PRIOR ART

The invention relates to an impact-absorbing headlamp system comprising at least one vehicle frame element that can be firmly connected to a vehicle, a vehicle headlamp housing displaceably held on the vehicle frame element having at least one pin connected to the vehicle headlamp housing, which is preferentially firmly connected to the vehicle headlamp housing, wherein the vehicle frame element comprises at least a guide for receiving and linearly guiding the pin, wherein the pin is in engagement with the guide so that the vehicle headlamp housing is guided by displacing the pin along the guide and is thereby displaceable with respect to the vehicle frame element, at least one triggering element that can be mechanically connected to a bumper of a vehicle, and at least one triggering mechanism that is firmly connected to the vehicle frame element, which is equipped in order to receive the triggering element and the pin and change, at least as a function of the position of the triggering element, between a state blocking the pin and a state releasing the pin, wherein in the state releasing the pin, the vehicle headlamp housing including the pin is displaceable with respect to the vehicle frame element.

Impact-absorbing vehicle headlamps serve to protect pedestrians since in the event of a collision, impact energy can be absorbed by displacing the vehicle headlamp. Document EP1332915 B1 shows an impact-absorbing vehicle headlamp according to the state of the art.

Existing impact-absorbing vehicle headlamp systems frequently have the disadvantage that the headlamp housings are resiliently held without being fixed in a position. Because of this, the headlamp housings can also be set into motion in situations in which such a motion is not at all desired or practical. Accordingly, for example shocks, vibrations while driving, manual pressure exerted during cleaning or in a carwash system etc. can lead to a displacement of the headlamps. This easy displaceability imparts a low-value unstable impression. However, increasing the stiffness of the system would reduce the pedestrian protection.

SUMMARY OF THE INVENTION

An object of the invention therefore consists in creating an impact-absorbing vehicle headlamp system which offers a reliable pedestrian protection imparting a high-value impression at the same time.

This object is solved with an impact-absorbing vehicle headlamp system of the type mentioned at the outset, in which the triggering mechanism according to the invention includes the following: a pivot arm pivotably mounted in the triggering mechanism, which pivot arm comprises an engagement region for receiving the pin, wherein the pivot arm is equipped in order to be pivoted between two positions, namely between a holding position, in which the pivot arm counteracts a movement of a pin received in the engagement region along the guide, and a release position, in which the pivot arm releases the movement of the pin along the guide, a locking element, which is linearly displaceably held in the release mechanism, wherein the locking element is equipped in order to engage in the pivot arm in the blocking position and lock the same as a function of the position of the triggering element in this blocking position or release a change into the release position, in which the locking element is displaceable between a locking position for blocking the pivot arm and an unlocking position for releasing the change of the pivot arm into the release position, wherein a first spring element is provided, which exerts a spring force on the locking element pushing the same into the locking position, wherein the locking element is mechanically coupled to the triggering element in such a manner that in a starting position of the triggering element the locking element is held in the locking position with the help of the first spring element, and that as a consequence of a displacement of the position of the triggering element into a triggering position, the locking element is displaced against the spring force into the unlocking position, so that a rotation of the pivot arm from the holding position towards the release position is made possible, and the triggering mechanism thus changes into the releasing state. By way of these features, a clever configuration of an impact-absorbing vehicle headlamp system is created, which on the one hand permits the displacement of a vehicle headlamp housing in the event of an accident, and on the other hand prevents undesirable displacements by locking the housing.

In particular it can be provided that a second spring element is provided, which is connected to the vehicle frame element and to the vehicle headlamp housing, which is equipped in order to exert a resetting spring force on the vehicle headlamp housing, so that the pin is pushed in the direction of the pivot arm. When the pin is held in the pivot arm, the vehicle headlamp housing is thus situated in a rest position. In the case of an activation by the triggering element, the pivot arm is released and the vehicle headlamp housing can be displaced together with the pin typically against the main beam direction of the headlamp. In the process, the spring absorbs impact energy which in the case of a collision is transferred from a pedestrian to the vehicle, in particular the headlamp or its housing.

Further it can be provided that the triggering mechanism comprises a third spring element which is arranged in such a manner that a force is exerted on the pivot arm which pushes the pivot arm in the direction of the holding position. By way of this, an automatic resetting of the pivot arm can take place. In particular it can be provided that the triggering mechanism comprises a displaceable holding element and a fourth spring element, wherein the holding element with the help of the spring element is equipped in order to obstruct a change of the pivot arm from the release position into the blocking position in that on a pivot arm situated in the release position a spring force is exerted which counteracts the spring force of the third spring element and exceeds the same, so that only by the addition of a resetting force of the second spring element exerted by the pin, a resetting of the pivot arm by displacing the holding element against the spring force of the fourth spring element is released.

Further it can be provided that the triggering element is formed as a projection, in particular as a pin.

In particular it can be provided that the locking element comprises a hook for engaging in the pivot arm.

Further it can be provided that the guide in the vehicle frame element is formed as a groove or elongated hole.

In particular it can be provided that the locking element is mechanically coupled to the triggering element in such a manner that by the triggering element entering the locking element, the locking element is pushed into the unlocking position against the force of the first spring element.

Further it can be provided that the vehicle headlamp housing includes at least one light module which is equipped for emitting a light distribution. By way of this, a headlamp is formed. The system thus likewise includes a headlamp.

Further it can be provided that the guide and the pin are configured in such a manner that the maximum stroke of the vehicle headlamp housing along the guide amounts to between 3 cm and 10 cm, in particular between 5 cm and 7 cm.

Further, the invention relates to a motor vehicle including at least one impact-absorbing vehicle headlamp system according to any one of the preceding claims. Further it can be provided that the motor vehicle comprises two front headlamp units for generating a low-beam light distribution and a high-beam light distribution, wherein the motor vehicle comprises two impact-absorbing vehicle headlamp systems, wherein the two vehicle headlamp housings of the two impact-absorbing vehicle headlamp systems form the vehicle headlamp housings of the two front headlamp units.

Further it can be provided that the motor vehicle comprises a bumper, wherein each triggering element is connected to the bumper so that in the case of a collision-induced displacing of the bumper, the triggering element is displaced in the direction of the vehicle headlamp and thus a displacement of the vehicle headlamp against the main travelling direction of the vehicle is made possible.

BRIEF DESCRIPTION OF THE DRAWINGS

In the following, the invention is explained in more detail by way of an exemplary and non-restrictive embodiment which is illustrated in the figures. Therein it shows FIG. 1 a schematic representation of an embodiment of an impact-absorbing vehicle headlamp system according to the invention in a first position, FIG. 2 a schematic representation of the impact-absorbing vehicle headlamp system according to the invention in accordance with FIG. 1 in a second position, FIG. 3 a schematic representation of the impact-absorbing vehicle headlamp system according to the invention in accordance with FIG. 1 and FIG. 2 in a third position, and FIG. 4 a schematic lateral view of the impact-absorbing vehicle headlamp system according to the invention in accordance with FIGS. 1 to 3.

Unless otherwise stated, same reference numbers designate same features in the following figures.

DETAILED DESCRIPTION OF EMBODIMENTS OF THE INVENTION

Figure 1:
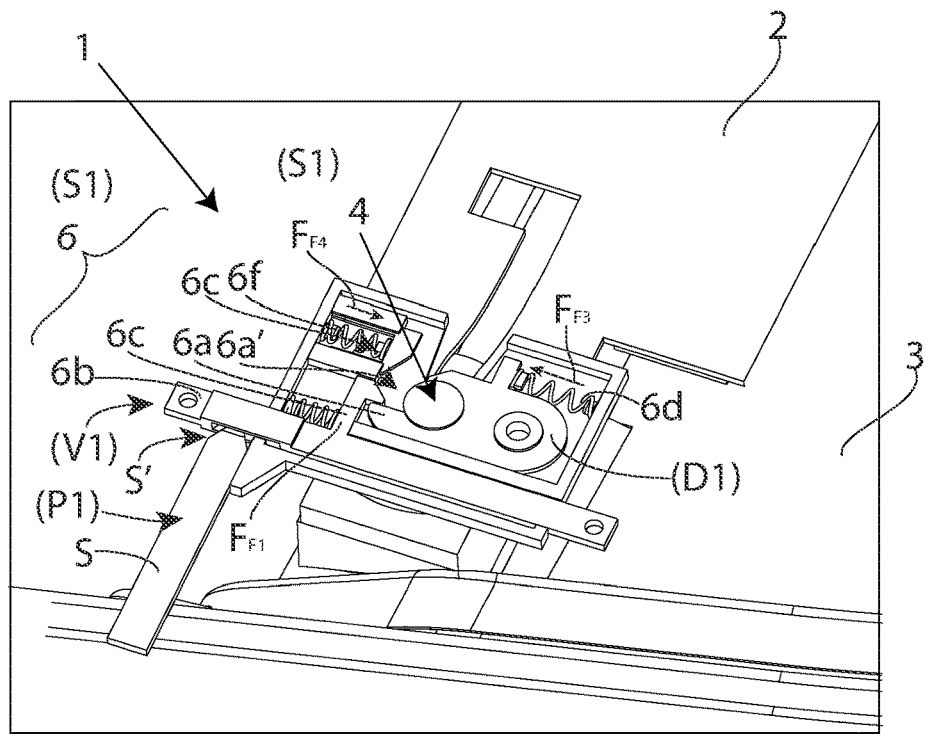

FIG. 1 shows a schematic representation of an embodiment of an impact-absorbing vehicle headlamp system 1 according to the invention in a first position. The impact-absorbing vehicle headlamp system 1 includes at least one vehicle frame element 2 that can be firmly connected to a vehicle and a vehicle headlamp housing 3 that is displaceably held on the vehicle frame element 2 having at least one pin 4 connected to the vehicle headlamp housing 3, which is preferentially firmly connected to the vehicle headlamp housing 3. The vehicle frame element 2 comprises at least one guide 2a for receiving and linearly guiding the pin 4, wherein the pin 4 is in engagement with the guide 2a so that the vehicle headlamp housing 3, by displacing the pin 4 along the guide 2a, is guided and thereby displaceable with respect to the vehicle frame element 2.

Further, the impact-absorbing vehicle headlamp system 1 comprises at least one triggering element 5 that can be mechanically connected to a bumper (not shown in the figures) of a vehicle and at least one triggering mechanism 6 that is firmly connected to the vehicle frame element 2. The triggering mechanism 6 is equipped in order to accommodate the triggering element 5 and the pin 4 and to change, at least as a function of the position of the triggering element 5, between a state S1 (see FIG. 1) blocking the pin 4 and a state S2 (see FIG. 3) releasing the pin 4. In the state S2 releasing the pin 4, the vehicle headlamp housing 3 including the pin 4 is displaceable with respect to the vehicle frame element, namely preferentially against the main travelling direction of the vehicle, so that a headlamp including the vehicle headlamp housing 3 can be pushed into the vehicle in the event of a collision with a pedestrian.

In FIG. 1 it is noticeable that the triggering mechanism 6 includes a pivot arm 6a that is pivotably mounted in the triggering mechanism 6. The pivot arm 6a comprises an engagement region 6a' for receiving the pin 4, wherein the pivot arm 6a is equipped in order to be pivoted between two positions, namely between a holding position D1, in which the pivot arm 6a counteracts a movement of a pin 4 received in the engagement region 6a' along the guide 2a, and a release position D2 (see FIG. 3), in which the pivot arm 6a releases the movement of the pin 4 along the guide 2a. Further, the triggering mechanism 6 comprises a locking element 6b which is linearly displaceably held in the triggering mechanism, wherein the locking element 6b is equipped in order to engage in the pivot arm 6a in the blocking position D1, and lock the same as a function of the position of the triggering element 5 in this blocking position D1 or release a change into the release position D2. To this end it is provided that the locking element 6b is displaceable between a locking position V1 for locking the pivot arms 6a and an unlocking position V2 (see FIG. 3) for releasing the change of the pivot arm 6a into the release position D2. A first spring element 6c is provided, which exerts a spring force $F_{F1}$ pushing the same into the locking position V1. The locking element 6b is mechanically coupled to the triggering element 5 in such a manner that in a starting position P1 of the triggering element 5 the locking element 6b, with the help of the first spring element 6c, is held in the locking position V1 and that as a consequence of a displacement of the position of the triggering element 5 into a triggering position P2 (see FIG. 3), the locking element 6b is displaced against the spring force $F_{F1}$ into the unlocking position V2, so that a rotation of the pivot arm 6a from the holding position D1 towards the release position D2 is made possible, and the triggering mechanism 6 thus changes into the releasing state S2.

Figure 4:
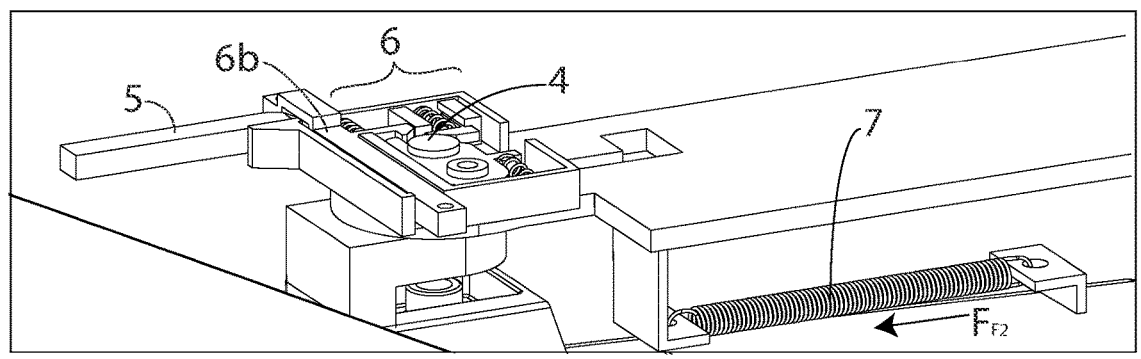

In FIG. 4, which shows a lateral view of the impact-absorbing vehicle headlamp system 1, it is noticeable that a second spring element 7 is provided, which is connected to the vehicle frame element 2 and to the vehicle headlamp housing 3. The second spring element 7 is equipped in order to exert a resetting spring force $F_{F2}$ on the vehicle headlamp housing 3, so that the pin 4 is pushed in the direction of the pivot arm 6a. When the pin 4 is held in the pivot arm 6a, the vehicle headlamp housing 3 is thus situated in a rest position; in the event of an impact of the triggering element 5, the pivot arm 6a is released and the vehicle headlamp housing 3, including the pin 4, can be typically displaced against the main beam direction of the headlamp. In the process, the spring 7 also absorbs impact energy which in the case of a collision is transferred for example from a pedestrian to the vehicle, in particular to the headlamp.

Viewing FIG. 1 it must be mentioned that the triggering mechanism 6 can comprise a third spring element 6*d* which is arranged in such a manner that a force $F_{F3}$ is exerted on the pivot arm 6*a*, which pushes the pivot arm 6*a* in the direction of the holding position D1. By way of this, an automatic resetting of the pivot arm 6*a* can take place.

Further it can be provided that the triggering mechanism 6 comprises a displaceable holding element 6*e* and a fourth spring element 6*f*. The element 6*e* is equipped with the help of the spring element 6*f* in order to obstruct a change of the pivot arm 6*a* from the release position D2 into the blocking position D1 in that a spring force $F_{F4}$ is exerted on a pivot arm 6*a* situated in the release position D2 which counteracts the spring force $F_{F3}$ of the third spring element 6*d* and exceeds the same, so that only through the addition of a resetting force $F_{F2}$ of the second spring element 7 exerted by the pin 4, a resetting of the pivot arm 6*a* by displacing the holding element 6*e* against the spring force $F_{F4}$ of the fourth spring element 6*f* is released. The triggering element 5 can be formed as a projection, in particular as a pin. It can be provided that the locking element 6*b* comprises a hook 6*b'* for engagement in the pivot arm 6*a*.

Figure 2:
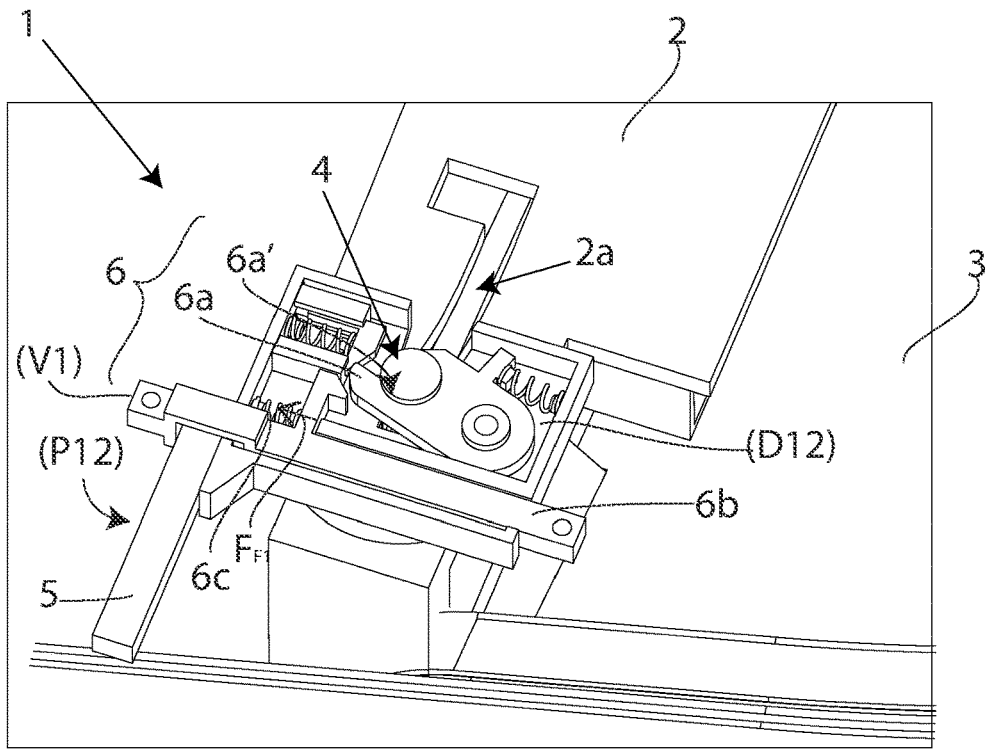
Figure 3:
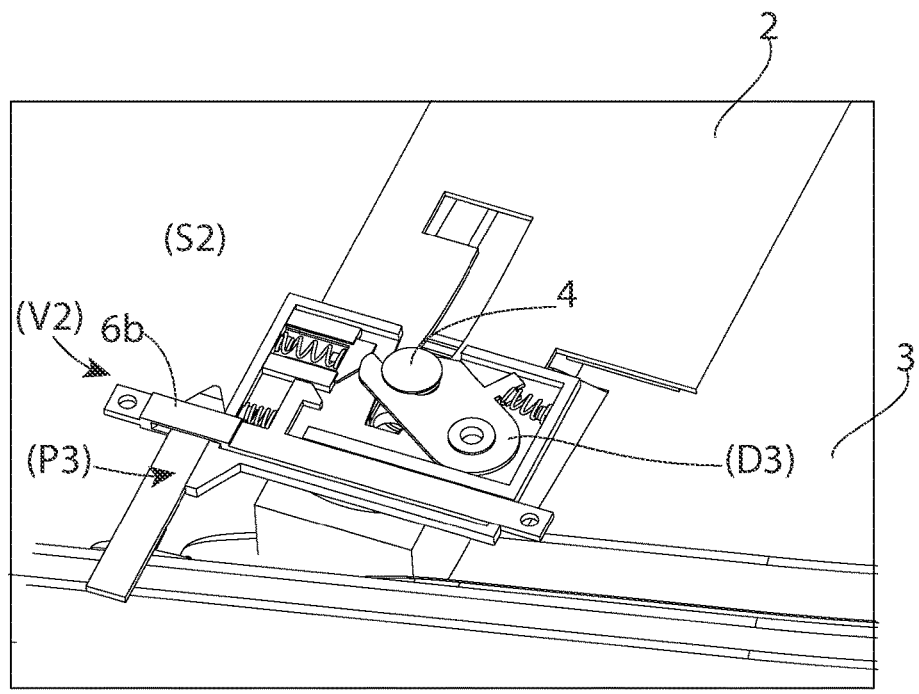

Viewing FIGS. 1 to 3, a triggering operation of the impact-absorbing vehicle headlamp system 1 is now explained, wherein the impact-absorbing vehicle headlamp system 1 is embodied so as to be self-healing. When, based on FIG. 1, an impact with the bumper connected to the triggering element 5 is carried out, the triggering element 5 can shift up to the release mechanism 6. By way of the entering bevelled surface 5' of the triggering element 5 (purely schematic representation), the locking element 6*b* is pushed against the spring force $F_{F1}$ to the left (see FIG. 2 in a centre position P12 and FIG. 3 in the position P2), as a result of which the hook 6*b'* no longer engages in the pivot arm 6*a*. When the impact now acts on the vehicle headlamp housing 3, the same including the pin 4 can be displaced along the guide 2*a* in the direction of the vehicle centre. The force exerted by the pin 4 pushes the pivot arm 6*a* against the spring force $F_{F3}$ into the position D3 (see FIG. 3), in which the pin 4 is released, so that the same can slide along the guide 2*a* against the spring force $F_{F2}$ in the direction of the vehicle centre until a maximum stroke is reached. The guide 2*a* and the pin 4 can be designed in such a manner that the maximum stroke of the vehicle headlamp housing 3 along the guide 2*a* amounts to between 3 cm and 10 cm, in particular between 5 cm and 7 cm. The guide 2*a* in the vehicle frame element 2 can be designed as a groove or elongated hole. In other words, the locking element 6*b* is mechanically coupled to the triggering element 5 in such a manner that when the triggering element 5 enters the locking element 6*b*, the locking element 6*b* is pushed against the force of the first spring element 6*c* into the unlocking position V2. FIG. 2 shows the triggering mechanism 6 in an intermediate position, in which the pin 4 is still held in the pivot arm 6*a*, but the pivot arm 6*a*, in a position P12, is no longer locked by the locking element 6*b* and can thus be moved in the direction of the spring force $F_{F3}$ and also against the said force. The movement direction depends on whether an external force as a consequence of a collision still acts on the headlamp housing 3. If this does not apply, the pin 4 is pushed into the pivot arm 6*a* so that the pivot arm 6*a* including the pin again moves into the starting position D1. Then, the triggering element 5 leaves the intermediate position P12 and again migrates back into the starting position P1.

It can be provided that the vehicle headlamp housing 3 includes at least one light module which is equipped for emitting a light distribution, in particular a low-beam light distribution and/or a high-beam light distribution.

Further, the invention relates to a motor vehicle that is not shown in the figures, including at least one impact-absorbing vehicle headlamp system 1 according to the invention.

The motor vehicle can comprise two headlamp units for generating a low-beam light distribution and a high-beam light distribution, wherein the motor vehicle can comprise two impact-absorbing vehicle headlamp systems according to the invention, wherein the two vehicle headlamp housings 3 of the two impact-absorbing vehicle headlamp systems form the vehicle headlamp housings of the two front headlamp units.

Further it can be provided that the motor vehicle comprises a bumper, wherein each triggering element 5 is connected to the bumper so that in the event of a displacement of the bumper due to a collision, the triggering element is displaced in the direction of the vehicle headlamp and thus a displacement of the vehicle headlamp against the main travelling direction of the vehicle made possible.

The invention is not restricted to the shown embodiments, but defined by the entire scope of protection of the claims. Individual aspects of the invention or of the embodiments can also be taken and combined with one another. Any reference numbers in the claims are exemplary and only serve for the easier legibility of the claims, without restricting these.

The invention claimed is:

1. A impact-absorbing vehicle headlamp system (1), comprising:
    at least one vehicle frame element (2) that can be firmly connected to a vehicle,
    a vehicle headlamp housing (3) that is displaceably held on the vehicle frame element (2), having at least one pin (4) connected to the vehicle headlamp housing (3), wherein the vehicle frame element (2) comprises at least one guide (2*a*) for receiving and linearly guiding the pin (4), wherein the pin (4) is in engagement with the guide (2*a*) so that the vehicle headlamp housing (3) is guided by the displacement of the pin (4) along the guide (2*a*) and thus displaceable with respect to the vehicle frame element (2),
    at least one triggering element (5) that can be mechanically connected to a bumper of a vehicle, and
    at least one triggering mechanism (6) that is firmly connected to the vehicle frame element (2), which is equipped in order to receive the triggering element (5) and the pin (4) and to change at least as a function of the position of the triggering element (5), between a state (S1) blocking the pin (4) and a state (S2) releasing the pin (4), wherein in the state (S2) releasing the pin (4) the vehicle headlamp housing (3) including the pin (4) can be displaced with respect to the vehicle frame element (2),
    wherein the triggering mechanism (6) comprises:
    a pivot arm (6*a*) that is pivotably mounted in the triggering mechanism (6), which pivot arm (6*a*) comprises an engagement region (6*a'*) for receiving the pin (4), wherein the pivot arm (6*a*) is equipped in order to be rotated between two positions, namely between a holding position (D1), in which the pivot arm (6*a*) counteracts a movement of a pin (4) received in the engagement region (6*a'*) along the guide (2*a*) and a release position (D2), in which the pivot arm (6*a*) releases the movement of the pin (4) along the guide (2*a*), a locking element (6b), which is linearly displaceably held in the triggering mechanism (6), wherein the locking element (6b) is equipped in order to engage in the pivot arm (6a) in the blocking position (D1), and lock the same as a function of the position of the triggering element (5) in the said blocking position (D1) or release a change into the release position (D2), in that the locking element (6b) is displaceable between a locking position (V1) for blocking the pivot arm (6a) and an unlocking position (V2) for releasing the change of the pivot arm (6a) into the release position (D2), wherein a first spring element (6c) is provided, which exerts on the locking element (6b) a spring force ($F_{F1}$) pushing the same into the locking position (V1), wherein the locking element (6b) is mechanically coupled to the triggering element (5) in such a manner that in a starting position (P1) of the triggering element (5) the locking element (6b) is held in the locking position (V1) with the help of the first spring element (6c), and that as a consequence of a displacement of the position of the triggering element (5) into a release position (P2), the locking element (6b) is displaced against the spring force ($F_{F1}$) into the unlocking position (V2), so that a rotation of the pivot arm (6a) from the holding position (D1) towards the release position (D2) is made possible, and the triggering mechanism (6) thus changes into the releasing state (S2).

2. A motor vehicle comprising at least one impact-absorbing vehicle headlamp system (1) according to claim 1.

3. The motor vehicle according to claim 2, wherein the motor vehicle comprises two front headlamp units for generating a low-beam light distribution and a high-beam light distribution, wherein the motor vehicle comprises two impact-absorbing vehicle headlamp systems according to claim 1, wherein the two vehicle headlamp housings (3) of the two impact-absorbing vehicle headlamp systems form the vehicle headlamp housings of the two front headlamp units.

4. The motor vehicle according to claim 3, wherein the motor vehicle comprises a bumper, wherein each triggering element (5) is connected to the bumper so that in the event of a collision-induced displacement of the bumper, the triggering element is displaced in the direction of the vehicle headlamp and thus a displacement of the vehicle headlamp against the main travelling direction of the vehicle is made possible.

5. The impact-absorbing vehicle headlamp system (1) according to claim 1, wherein a second spring element (7) is provided, which is connected to the vehicle frame element (2) and to the vehicle headlamp housing (3), wherein the spring element (7) is equipped in order to exert a resetting spring force ($F_{F2}$) on the vehicle headlamp housing (3), so that the pin (4) is pushed in the direction of the pivot arm (6a).

6. The impact-absorbing vehicle headlamp system (1) according to claim 1, wherein the triggering mechanism (6) comprises a third spring element (6d), which is arranged in such a manner that on the pivot arm (6) a force ($F_{F3}$) is exerted, which pushes the pivot arm (6a) in the direction of the holding position (D1).

7. The impact-absorbing vehicle headlamp system (1) according to claim 1, wherein the triggering mechanism (6) comprises a displaceable holding element (6e) and a fourth spring element (6f), wherein the holding element (6e) is equipped with the help of the spring element (6f) to obstruct a change of the pivot arm (6a) from the release position (D2) into the blocking position (D1) in that a spring force ($F_{F4}$) is exerted on a pivot arm (6a) situated in the release position (D2), which counteracts the spring force ($F_{F3}$) of the third spring element (6d) and exceeds the same, so that only by the addition of a resetting force ($F_{F2}$) of the second spring element (7) exerted by the pin (4), a resetting of the pivot arm (6a) by displacing the holding element (6e) against the spring force ($F_{F4}$) of the fourth spring element (6f) is released.

8. The impact-absorbing vehicle headlamp system (1) according to claim 1, wherein the triggering element (5) is designed as a projection, in particular as a pin.

9. The impact-absorbing vehicle headlamp system (1) according to claim 1, wherein the locking element (6b) comprises a hook (6b') for engagement in the pivot arm (6a).

10. The impact-absorbing vehicle headlamp system (1) according to claim 1, wherein the guide (2a) in the vehicle frame element (2) is designed as a groove or elongated hole.

11. The impact-absorbing vehicle headlamp system (1) according to claim 1, wherein the locking element (6b) is mechanically coupled to the triggering element (5) in such a manner that by the triggering element (5) entering the locking element (6b), the locking element (6b) is pushed against the force of the first spring element (6c) into the unlocking position (V2).

12. The impact-absorbing vehicle headlamp system (1) according to claim 1, wherein the vehicle headlamp housing (3) includes at least one light module, which is equipped for emitting a light distribution.

13. The impact-absorbing vehicle headlamp system (1) according to claim 1, wherein the guide (2a) and the pin (4) are designed in such a manner that the maximum stroke of the vehicle headlamp housing (3) along the guide (2a) amounts to between 3 cm and 10 cm.

14. The impact-absorbing vehicle headlamp system (1) according to claim 13, wherein the maximum stroke of the vehicle headlamp housing (3) along the guide (2a) amounts to between 5 cm and 7 cm.

15. The impact-absorbing vehicle headlamp system according to claim 1, wherein the at least one pin (4) is firmly connected to the vehicle headlamp housing (3).

* * * * *